United States Patent
Baumann et al.

(10) Patent No.: US 7,117,748 B2
(45) Date of Patent: Oct. 10, 2006

(54) SENSOR ARRANGEMENT FOR FORCE MEASUREMENT

(75) Inventors: Dietmar Baumann, Hemmingen (DE); Dirk Hofmann, Ludwigsburg (DE); Herbert Vollert, Vaihingen/Enz (DE); Willi Nagel, Remseck/Hochdorf (DE); Andreas Henke, Diemelstadt (DE); Bertram Foitzik, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 10/788,325

(22) Filed: Mar. 1, 2004

(65) Prior Publication Data

US 2004/0187591 A1    Sep. 30, 2004

(30) Foreign Application Priority Data

Aug. 31, 2003 (DE) ............................... 103 14 449

(51) Int. Cl.
*G01L 1/00* (2006.01)
*G01B 7/16* (2006.01)

(52) U.S. Cl. ..................................... 73/779
(58) Field of Classification Search ................. 73/779; 188/161, 181 T, 73.44; 701/70
See application file for complete search history.

(56) References Cited

U.S. PATENT DOCUMENTS

| | | | | |
|---|---|---|---|---|
| 5,826,683 A * | 10/1998 | Murata et al. | ............... | 188/161 |
| 6,371,250 B1 * | 4/2002 | Bunker | ...................... | 188/18 A |
| 6,439,355 B1 * | 8/2002 | Kimble | ...................... | 188/171 |
| 6,464,306 B1 * | 10/2002 | Shaw et al. | .................... | 303/3 |
| 6,640,937 B1 * | 11/2003 | Bunker | ...................... | 188/18 A |
| 6,668,983 B1 * | 12/2003 | Drennen et al. | ......... | 188/181 T |
| 6,748,310 B1 * | 6/2004 | Tamasho et al. | .............. | 701/70 |
| 6,752,249 B1 * | 6/2004 | Jungbecker et al. | ........ | 188/162 |

* cited by examiner

*Primary Examiner*—Octavia Davis
(74) *Attorney, Agent, or Firm*—Ronald E. Greigg

(57) ABSTRACT

A sensor arrangement for detecting mechanical forces (F) with at least one magnetic-field-dependent sensor element, in which the output signal of the sensor element depends on the deflection of a mechanical component in the magnetic field in response to the exertion of force. The mechanical component here is a spring, which changes its location in the magnetic field in response to the exertion of force and is a component of a brake system for a motor vehicle; the at least one sensor element being located in the force flow of the brake caliper.

10 Claims, 2 Drawing Sheets

SENSOR ARRANGEMENT FOR FORCE MEASUREMENT

BACKGROUND OF THE INVENTION

1. Field of the Invention

The invention relates to a sensor arrangement for force measurement, particularly in a motor vehicle.

2. Description of the Prior Art

It is known that in rotating parts that are guided by a roller bearing, such as on the wheel support of a motor vehicle, various measurement variables occur that are of great relevance to the driving systems and possibly also to the brake systems. The thus-supported components are often components of anti-lock brake systems, traction controls, or other control systems that favorably affect either driving performance or driving safety. It can be highly important to obtain measurement data, for instance about the rpm, the forces transmitted from the roadway to the vehicle via the wheel, or data about acceleration and braking forces.

Hydraulic brake systems in particular, or electromechanical brake systems known for instance from German Patent Disclosure DE 196 52 230 A1, and self-boosting electromechanical brake systems that are known per se can be considered as possible applications here. As a rule, such electromechanical brakes, and especially disk brakes, require information about the normal force exerted when the brake linings are pressed against the brake disk. Suitable force sensors are generally used for this purpose.

From German Patent Disclosure DE 197 53 554 A1, one such active magnetic field-force sensor is known, in which there is a magnetoelastic measuring element that is acted upon by a force to be measured and is disposed in a circular magnetic field in such a way that a change in the magnetic field caused by the force to be measured can be evaluated, for instance with an anisotropic magnetoresistive sensor (AMR sensor).

OBJECT AND SUMMARY OF THE INVENTION

A sensor arrangement for detecting mechanical forces with at least one magnetic-field-dependent of the generic type in question is advantageously further refined according to the invention by providing that the mechanical component is a spring, which changes its location in the magnetic field in response to the exertion of force. In a preferred application, the spring is a component of a brake system for a motor vehicle, and the at least one sensor element is located in the force flow of the brake caliper.

In a first advantageous embodiment, the at least one sensor element is located on one side of the brake caliper of a disk brake, as the brake system, and an electric motor for generating a tightening force is located on the other side of the brake caliper.

In another advantageous embodiment, the at least one sensor element and an electric motor for generating a tightening force are located on one side of the brake caliper of a disk brake.

In all the possible embodiments, it is especially advantageous if the at least one magnetic- field-dependent sensor element is an AMR or GMR sensor. Such AMR (anisotropic magnetoresistance) or GMR (giant magnetoresistance) sensors measure the direction of the field lines that pass through the sensor element. As a result, the offset of the sensor element in the horizontal direction to the magnet pole transition can also be determined from the change in magnetic field at a magnet.

Preferably, the magnet for generating the magnetic field required is disposed directly next to the sensor element; however, it is also possible for this magnet to be offset somewhat three-dimensionally, in which case then the field lines need merely be guided past the sensor element.

By the use according to the invention of an AMR or GMR sensor in combination with a resilient element in an electromechanical brake, the brake force sensing can be achieved simply and economically. The fact is exploited that the combination of a resilient element with a travel measurement creates a force sensor. The resilient element, when used in a brake, can advantageously be a part of the brake caliper.

In summary, advantages of the invention are obtained particularly because the measurement principle employed making the use of the economical and a small-sized equipment possible, in which the demands for precision in terms of the spacing between the magnet and the sensor element are not critical. Moreover, by the combination of a spring with the sensor, nonlinear characteristic curves can be generated; greater strokes occur at low forces and lesser strokes at high forces, which has a favorable effect on the behavior of the brake, since at high braking moments a lesser precision is sufficient; while at low forces high precision is absolutely necessary.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

Figure 1:
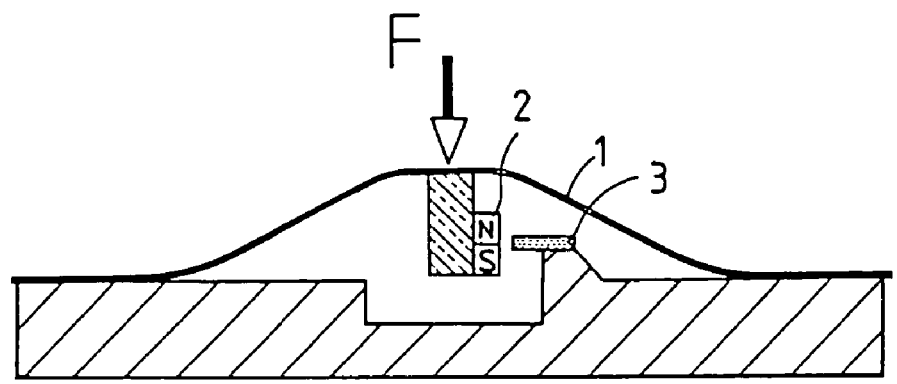
FIG. 1 is a basic elevation view, in section, of a spring, acted upon by a force, that cooperates with a magnetic-field-dependent sensor.

In FIG. 1, to explain the mode of operation, a sketch is shown in which a spring 1, upon being acted upon by a force F, deflects a magnet 2 in such a way that a change in the magnetic field can be detected with a sensor element 3 as a force sensor. Such sensor elements, for instance in the aforementioned AMR and GMR versions, measure the direction of the field lines that pass through the sensor element 3. As a result, the offset of the sensor element 3 in the horizontal direction to the magnet pole transition can also be determined by the change in magnetic field at the magnet 2.

The principle of the invention, in electromechanical self-boosting brakes, can advantageously be realized in a brake disk, but the principle also functions in a classical electromechanical brake. The manner in which the brake is actuated however, is not relevant. In that case the sensor element 3 serves to detect the actuation, or normal force F, with which the brake linings are pressed against the brake disk.

The travel x of the spring 1 is dependent on the force F applied and on the spring constant c, expressed by the equation:

$$\left(x = \frac{F}{c}\right).$$

Figure 2:
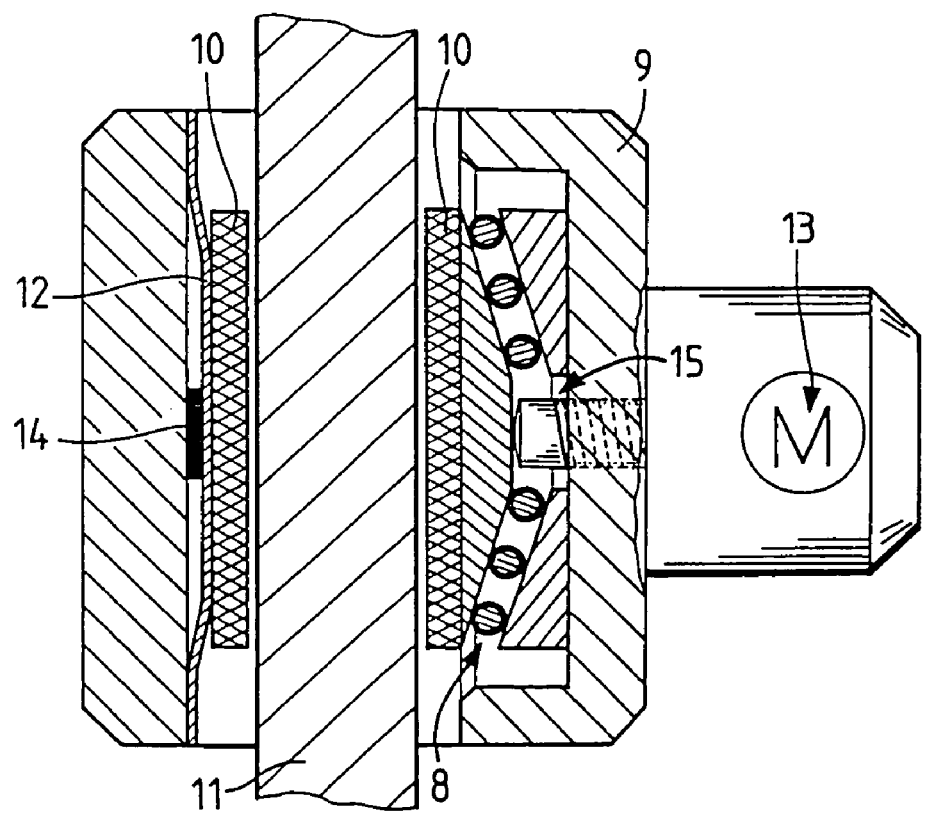
FIG. 2 shows a brake system for a motor vehicle with a disk brake, in which in a first embodiment, a sensor element and an electric motor for generating the actuation, or tightening force are disposed on different sides of te brake caliper.

The elements described in conjunction with FIG. 1 can as shown in FIG. 2 be integrated into the brake system of a motor vehicle; it must merely be assured that the sensor arrangement of the invention be located in the force flow of a brake caliper 9 that has a self-boosting bearing 8. This can be the case at various places. In the arrangement shown in FIG. 2, brake linings 10 engage a brake disk 11, and an electric motor 13, via a motor spindle 15, is disposed on one side of the brake caliper 9, while a spring 12 and an AMR sensor element 14 are disposed on the other side of the brake caliper 9.

Figure 3:
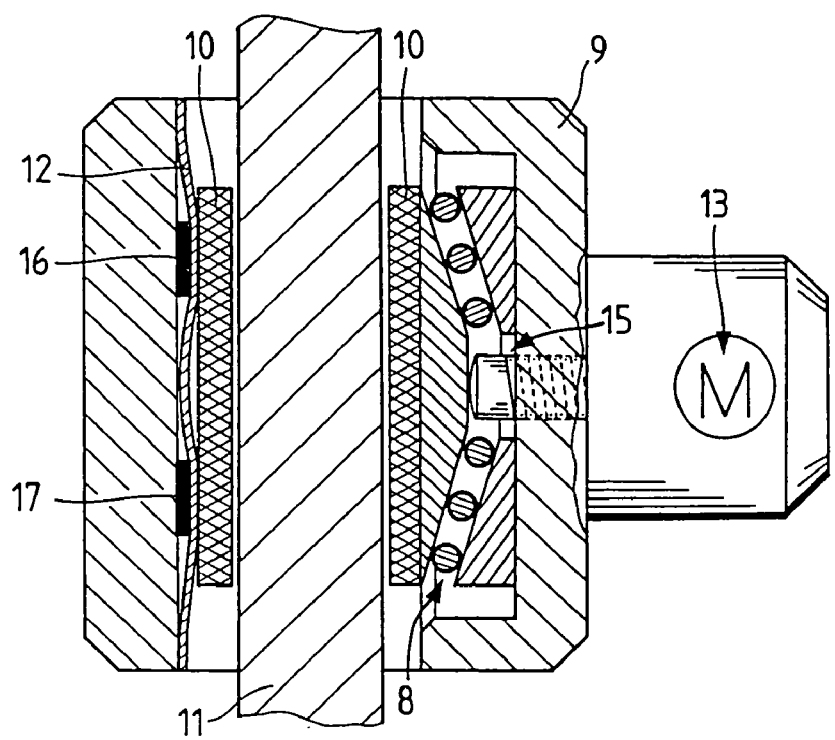
FIG. 3 shows a second exemplary embodiment, which in a modification of FIG. 1 has two sensor elements.

In the exemplary embodiment of FIG. 3, unlike the example of FIG. 2, two AMR sensor elements 16 and 17 are mounted symmetrically to the spring 12.

Figure 4:
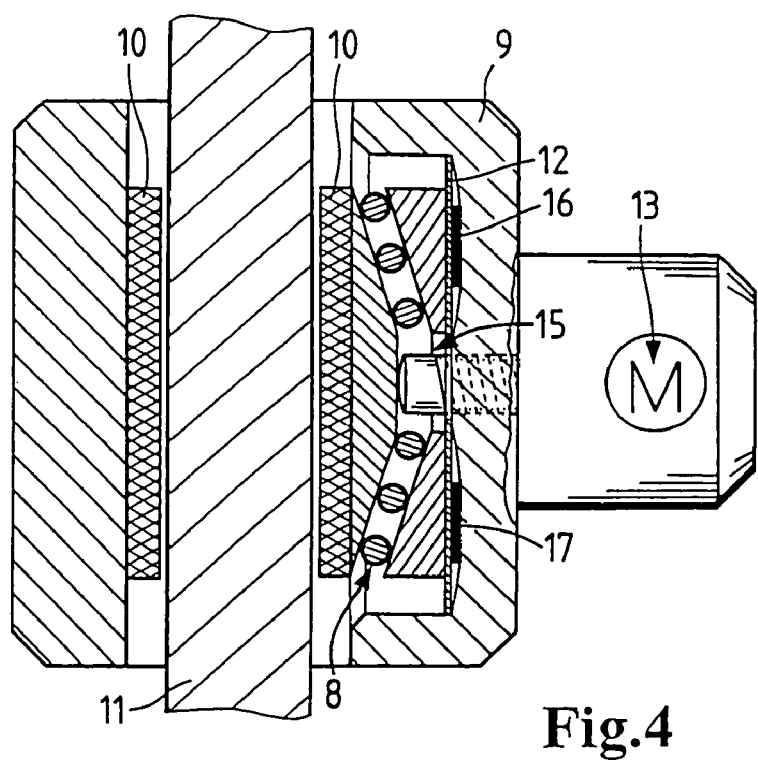
FIG. 4 shows a third modified exemplary embodiment, with sensor elements that are disposed on the same side of the brake caliper as the electric motor.

In FIG. 4, a third exemplary embodiment can be seen, in which the AMR sensor elements 16 and 17 are mounted in the support plate of a self-boosting brake on the same side as the electric motor 13. Still other exemplary embodiments not shown here are also possible, for instance in which the sensor elements are disposed behind the support bearing of a classical electromechanical brake.

The foregoing relates to preferred exemplary embodiments of the invention, it being understood that other variants and embodiments thereof are possible within the spirit and scope of the invention, the latter being defined by the appended claims.

We claim:

1. In a sensor arrangement for detecting mechanical force (F), having at least one magnetic-field-dependent sensor element (3; 14; 16, 17), wherein the output signal of the sensor element (3; 14; 16, 17) depends on the deflection of a mechanical component (1; 12) in the magnetic field in response to the exertion of a force which actuates a disk brake system, which actuation force is perpendicular to the brake disk, the improvement wherein the mechanical component comprises a spring (1; 12) which changes its position in the magnetic field as a result of and in a direction which is parallel to the force which actuates the brake system.

2. The sensor arrangement in accordance with claim 1, wherein the spring (12) is a component of a brake system for a motor vehicle.

3. The sensor arrangement in accordance with claim 2, comprising at least one sensor element (14; 16, 17) located on one side of a brake caliper (9) of a disk brake system, and
an electric motor (13) for generating the force which actuates the brake is located on the other side of the brake caliper (9).

4. The sensor arrangement in accordance with claim 2, comprising at least one sensor element (14; 16, 17) located on one side of a brake caliper (9) of a disc brake system, and
an electric motor (13) for generating the force which actuates the brake is located on the same side of the brake caliper (9).

5. The sensor arrangement in accordance to claim 1, wherein at least one magnetic-field-dependent sensor element (3; 14; 16, 17) is an AMR or GMR sensor.

6. The sensor arrangement in accordance to claim 2, wherein at least one magnetic-field-dependent sensor element (3; 14; 16, 17) is an AMR or GMR sensor.

7. The sensor arrangement in accordance to claim 3, wherein at least one magnetic-field-dependent sensor element (3; 14; 16, 17) is an AMR or GMR sensor.

8. The sensor arrangement in accordance to claim 4, wherein at least one magnetic-field-dependent sensor element (3; 14; 16, 17) is an AMR or GMR sensor.

9. In a sensor arrangement for detecting mechanical force (F), having at least one magnetic-field-dependent sensor element (3; 14; 16, 17), wherein the output signal of the sensor element (3; 14; 16, 17) depends on the deflection of a mechanical component (1; 12) in the magnetic field in response to the exertion of force,
the sensor arrangement comprises a brake caliper (9) and an actuator (13), and the improvement wherein
the mechanical component comprises a spring (1; 12) which is in the magnetic field adjacent the sensor element, the sensor element and spring can be located either on one side of the brake caliper and the actuator is located on the opposite side of the brake caliper, or the sensor element and spring are located on one side of the brake caliper and the actuator is located on the same side of the brake caliper.

10. The sensor arrangement in accordance to claim 9, wherein at least one magnetic-field-dependent sensor element (3; 14; 16, 17) is an AMR or GMR sensor.

* * * * *